Dec. 5, 1933. M. FASOLI ET AL 1,938,248
VALVE FOR CONTINUOUS AUTOMATIC MODERABLE BRAKES
Filed June 2, 1931 3 Sheets-Sheet 3

Patented Dec. 5, 1933

1,938,248

UNITED STATES PATENT OFFICE 1,938,248

VALVE FOR CONTINUOUS AUTOMATIC MODERABLE BRAKES

Mario Fasoli and Manlio Diegoli, Firenze, Italy, assignors to Societá Italiana Ernesto Breda Per Costruzioni Meccaniche, Milan, Italy Application June 2, 1931, Serial No. 541,700, and in Italy June 10, 1930

16 Claims. (Cl. 303—23)

The present invention relates to automatic compressed air brakes for railway vehicles and its object is particularly a valve operated under a differential action, offering, against known patterns, many technical advantages. The type of brakes which better suits the most varied conditions of line's profile of railway systems, is the "moderable both in braking and releasing" and the "inexhaustible" type. A brake is inexhaustible when it is required, to complete the braking, that the pressure in the main brake pipe and in the various auxiliary reservoirs should have attained the value it had in the initial operating conditions. The requirement for "inexhaustibility" condition causes generally very serious drawbacks: in fact the main brake pipe diameter being necessarily limited and given the considerable length of said pipe, it is evident that normal operating pressure will be arrived at more rapidly towards the head of the train than towards the tail end.

In order to accelerate the increase of pressure in the main brake pipe of the rear cars of a long train and to avoid consequently long stand-by's after every braking operation, there is no other means but to feed abundantly the main pipe.

In the valves of the "inexhaustible" type of brakes heretofore known, this is possible only within very close limits beyond which there may occur phenomena which can defer considerably the brake releasing operations, making them extremely delicate.

The valve, object of the present invention, being simple and rugged, combines in the surest manner the "inexhaustible" feature of the brake with the possibility of a quick release.

In the type of valve which will be hereafter described in every detail, the beginning of the release depends upon a preliminary displacement of a certain piston connected to a suitable controlling member having the shape of a slide valve, whilst for the subsequent operation, the position of the same piston becomes indifferent.

Such a contrivance allows, at will, an easy reduction of the operating pressure, whilst it obtains a great sensitivity of the brake as soon as the braking operation is started. Besides, for every initial operating condition of pressure during braking, the pressure in the brake cylinder depends exclusively upon that pressure existing in the main brake pipe, whilst during release of brakes it depends directly upon the pressure of the auxiliary reservoir, for the reason that in the first case the equation of balance refers to such elements as: main pipe-controlling chamber-brake cylinder and in the second case to such as: auxiliary reservoir-controlling chamber-brake cylinder. Said valve secures at any time for the brake a practically constant value of total energy, that is, the energy contained in the compressed air in the auxiliary reservoir does not diminish, but for the increase, according to a preestablished low, of the pressure in the brake cylinder and vice versa.

The brake results therefore, perfectly "inexhaustible". Another feature is that the controlling chamber is closed by such a retaining valve, that whilst its feeding can always be obtained even with brakes on, as soon as the pressure in the auxiliary reservoir has reached a sufficiently high value, the return of the air from such a controlling chamber back to the auxiliary reservoir is, on the contrary, possible only with brakes released, so that during the braking operation there can be no untimely or involuntary drop of pressure of the controlling chamber. An important feature to be noted, is this, that the feeding of the control chamber from the main brake pipe, takes place in series and subsequently to that of chamber B and of the auxiliary reservoir, so that any momentary variation of the working pressure results minimized and deprived of any irregular consequences, whilst securing homogeneity between the values of the various pressures in play.

The valve forming the object of the present invention allows also to brake loaded cars more energetically than empty ones, by means of a second brake-cylinder. When both the cylinders are used, the feed and the exhaust of the air in each, is obtained through holes and passages entirely independent from each other.

The application or nonapplication of the auxiliary cylinder for the load, is allowed by the fact that the main body, of single pattern for the different conditions of application, is provided with a cock applied on the valve by means of screws, so as to be easily changed or replaced with another cock allowing other connections to be established, as required by the different operation of the valve.

A further advantage should also be noted, which is allowed by the arrangement of the various members: the discharge hand-valve, applied on known types on the control chamber, (causing the serious drawback of creating a weak point for air-leakages, which should be absolutely prevented) can easily be applied elsewhere, it being equally possible however to remove, by operating the above said valve, any overload existing eventually in the control chamber. The invention will be described in more detail with reference to the accompanying drawings, which represent diagrammatically an embodiment of the same, shown purely as an example.

Figure 1:
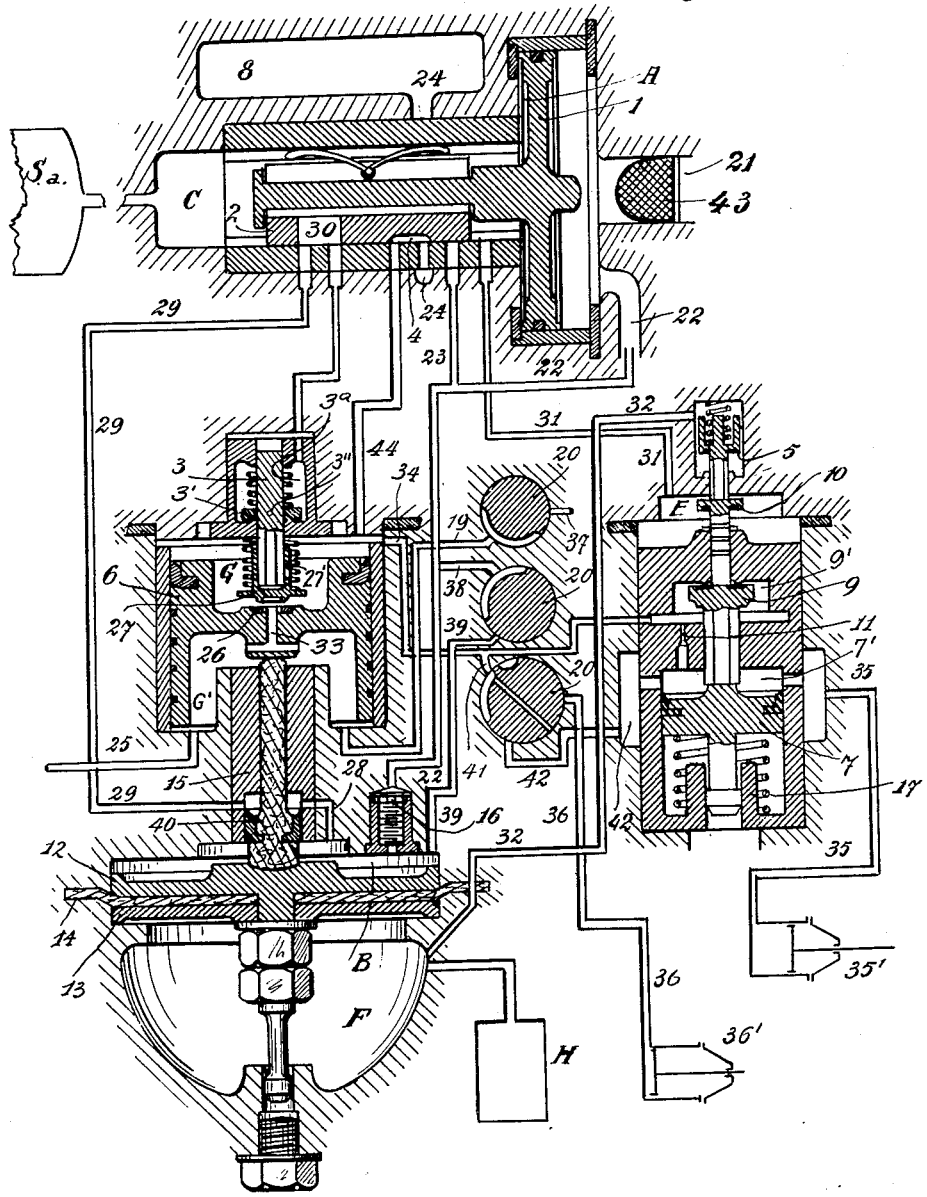
Fig. 1 is a diagram of the valve according to the invention.

In the embodiment shown, the triple valve is preferably formed of three main bodies: upper, medium and lower. In the upper body are to be found: triple valve piston casing A, slide valve casing C, piston 1 which controls the slide E, valve 2. A valve stem 3 having a valve 3' fixedly secured to an intermediate portion thereof as at 3'' is located so as to control the feeding and discharging of the compressed air to the brake cylinder, while a retaining valve 5 of the control chamber F is placed on the side. Cavity 8, cut out in the body, forms the accelerating chamber. Suitable passages and ducts cut in said bodies, connect these various members one to another; they will be better described and specified hereafter.

In the medium body there is: in the centre, at the top, the equalizing piston 6 and at the bottom the controlling differential piston formed by two discs 12 and 13 clamping the diaphragm 14. Articulated stem 15 transmits the pressures from one piston to the other. Laterally is found: valve 9 regulating the air admission to the brake cylinder, controlled by piston 7. Valve 9, in its turn, by means of the intermediary valve 10, controls the opening of the retaining valve 5 that communicates with the control chamber F. On the medium body is also applied laterally cock 20 by means of two studs (not shown), and in the lower part above the diaphragm is the throttle 16, whose particularly important function will be shown when describing the operation of the triple valve.

The lower body is extremely simple: its function is to guide the operating piston and to secure the edges of diaphragm 14, so as to separate absolutely the two chambers B and F placed respectively above and below said diaphragm.

As specified by international regulations, the construction of the triple valve is prepared so as to satisfy the required operating conditions for vehicles to be used exclusively with freight trains, with a device for braking extra the load and for vehicles to be used with both freight and passenger trains, with the "Freight" and "Passengers" device. In each case the same triple valve can be used for the particular operation in all the above conditions and for any size of brake cylinders, according to the pattern of cock fitted on it and which, as already shown, is applied to the medium body simply by two studs.

The system offers a few very remarkable advantages:

(1st) A member so easy to get out of order as a cock, is, can be replaced rapidly and at a low cost.

(2nd) The spare-valves can be reduced in number as all working conditions can be met with a single pattern of valve and its series of interchangeable cocks.

By using on the triple valve the cock illustrated in the drawings, a valve suitable for vehicles to be used exclusively with freight trains is obtained, which vehicles may be equipped with two brake cylinders 35' and 36', allowing also the braking of the load. According to the way the cock 20 is turned, the braking is operated by a single or by both cylinders, connected one to another by said cock.

The filling and discharge of the two brake cylinders are independent, being obtained by means of separate passages. When the cock is in the position shown, the braking is obtained only by means of the cylinder 35' called "Tare cylinder" that is for the empty vehicle.

Figure 2:
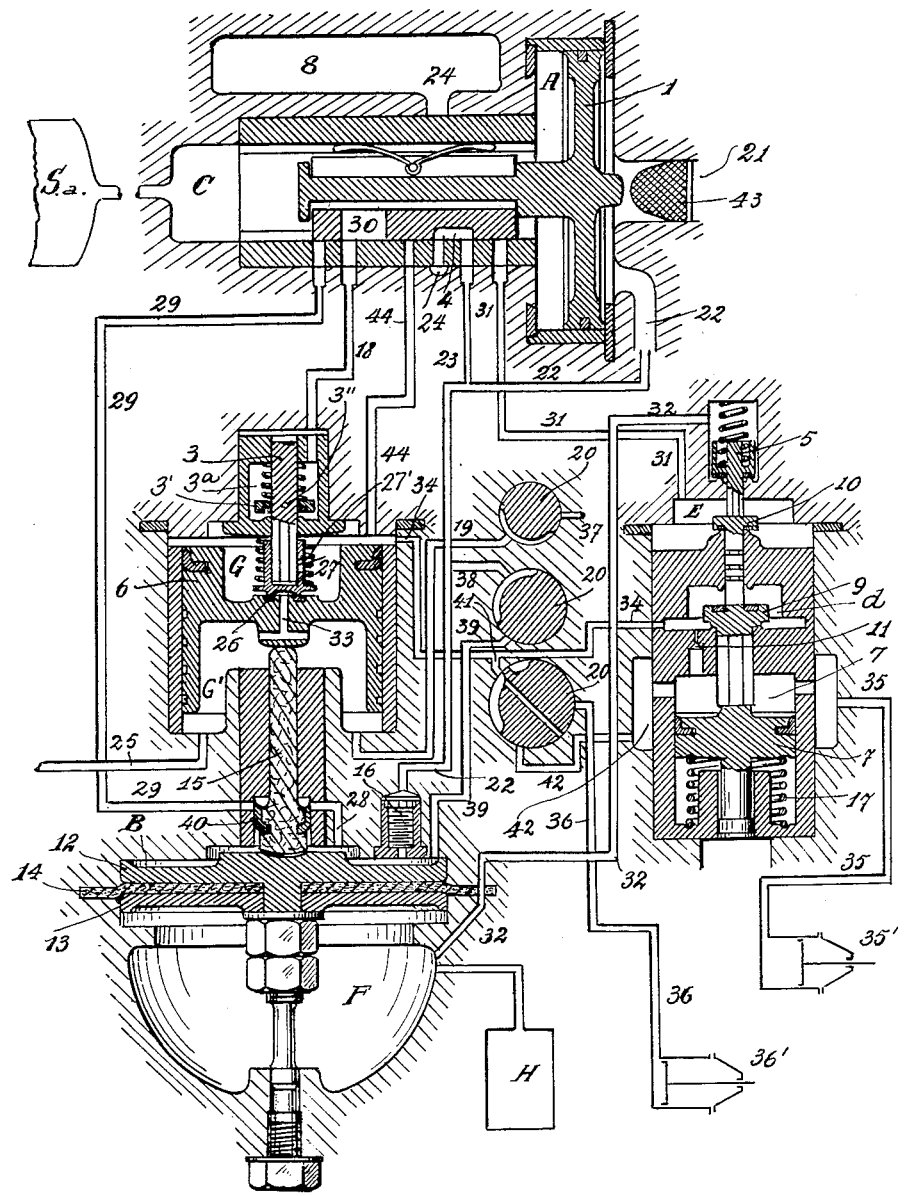
Fig. 2 is a diagram similar to Fig. 1, but with the controlling members in a different position.

The air in the main brake pipe, reaches the triple valve by means of passage 21. If desired the main brake pipe cleaning device, may have a filter 43: compressed air arrives in chamber A (see Fig. 1) and pushes piston 1 towards the left to its end position. Meanwhile through pipe 22, which is constantly connected to the main brake pipe and to the throttle 16, the air of the main brake pipe reaches chamber B above the differential piston which moves to its lowest position as shown in Fig. 1 and through pipes 28 and 29 and cavity 30 cut in the slide valve, reaches chamber C which is constantly in direct connection both with the auxiliary reservoir $S_a$ and with feed-valve chamber $3a$ through pipe 13. By means of passage 31, the air of said auxiliary reservoir $S_a$ comes in through the chambers C to the brake cylinder controlling chamber E, and upon raising of the valve 5 due to the upward movement of the valve 7 allows the air to pass through pipe 32 and be delivered to the chamber F under the differential operating piston. The capacity of said chamber F can be eventually increased by the addition of a small extra reservoir H. In order to arrive in chamber B compressed air must go through the throttle 16, which in Figures 1 and 2 is formed by a labyrinth passage: in the lower end of the pipe 22, will prevail the pressure of the main brake pipe. The chamber B and the auxiliary reservoir $S_a$ are in communication one with another by means of pipes 28 and 29, of greatly superior section than the labyrinth passage, so that there will be a uniform pressure more or less lower than the one prevailing in the main brake pipe, according to the time taken for the filling-up phase. After a certain time has elapsed, the capacities placed fore and aft of the labyrinth will have reached the same operating pressure prevailing in the main brake pipe 21.

The operation of braking is as follows:

Compressed air, can come to the brake cylinder from the auxiliary reservoir, only by the lifting of the central feed-valve stem 3 and it is evident, that in order to bring about braking action, the differential operating piston must lift. To obtain this, a certain difference in pressures must be brought about on the two faces of said piston. On account of the labyrinth, the capacities B and F beyond it have a tendency to maintain balanced pressures so long as they remain freely connected to each other, so that, notwithstanding the high sensitivity of the operating piston, the braking operation can be started only when by the upper piston 1 and of its slide valve 2 moves to the position as shown in Figure 2, at which time the auxiliary reservoir $S_a$ is cut off from the pipe 31 that communicates with the brake cylinder controlling chamber E, which in turn communicates through the valve 5 and pipe 32 with the control chamber F while chamber B, through labyrinth 16 and passage 22 remains connected only with the main brake pipe.

As, for its particular functions, it is sufficient that piston 1 should move initially under a difference in pressure of 0,2 to 0,3 kilos per square cm. (2,85 to 4,25 lbs. per sq. inch) on its two faces, a first feature in the operation of the triple valve is this: In running position the valve obtains a great steadiness, notwithstanding its having a great sensitivity to subsequent variations in braking.

On causing therefore a drop in pressure of about 0,3 kilos the piston 1 will move from its left hand position, to its right hand end position (see Fig. 2) dragging along its slide-valve 2.

The latter operates then as follows:

(a) by means of recess 4 and of passages 23 and 24 it connects the main brake pipe with the accelerating chamber 8, thus causing in said main pipe a sudden drop in pressure, whose effect is to increase considerably the velocity of propagation of the pressure drop brought about by the engine driver. The passage 24 may be in the form of a peripheral groove which communicates the chamber 8 with the recess 4.

(b) It isolates the auxiliary reservoir $S_a$ by cutting out the connection which existed through pipes 29 and 28, between said reservoir and chamber B above the differential operating piston.

(c) It closes channel 31, thus isolating also the control chamber F which consequently remains at its operating pressure.

Chamber B is left in communication with the brake pipe, and due to the small volume of the same chamber, its pressure has a tendency to balance immediately with the pressure in the brake pipe. At this moment the differential piston lifts and through stem 15, causes the equalizing piston 6 to lift also.

At first, seat 26 comes in contact with valve 27 which is slidably connected to the lower portion of the valve stem 3 as at 27' so as to be axially movable relative thereto for a limited distance and which also provides a lost motion connection to the valve stem closing passage 33 connected to the discharge 25, then the bottom of valve 27 comes in contact with the stem 3, which in its turn causes valve 3' to be lifted from its seat so that the air of the auxiliary reservoir $S_a$ can reach the equalizing chamber G above the equalizing piston and through passage 34, is conducted to chamber 9' above the raised feed valve 9 and deliver to the chamber 7' that communicates with the passage 35 (all of them of ample section) which in turn communicates with the brake-cylinder 35', where the pressure can rise almost instantly to a value of about 0,6 kilos (4,25 lbs/sq.").

As soon as such a pressure is reached in the brake cylinder 35' and consequently over the piston 7, the resistance of spring 17 is overcome, piston 7 moves down so that also valve 9 drops on its seat, so that the subsequent air-feed to the brake cylinder will then take place only through the gauged orifice 11.

Meantime, also the intermediary valve 10 drops, thus allowing the retaining valve 5 to the control chamber F to close.

The central feed-valve 3 will remain open until the pressure acting on the equalizing piston 6 added to the pressure exerted by the air of the main brake pipe on the upper face of the differential operating piston (chamber B) will balance the pressure exerted by the air in control chamber F on the lower face of the same piston.

As soon as this given pressure is reached on the equalizing piston, both differential operating piston and the equalizing piston will drop, until the feed-valve is closed, without however opening the connection with the exhaust.

On further diminishing the pressure in the main brake pipe, the balance first attained is broken and a corresponding increase in pressure in brake cylinder 35' will be obtained in a similar way as described above, until with subsequent pressure drops, the maximum of braking is attained, corresponding to the balance in pressures between auxiliary reservoir $S_a$ and brake cylinder 35'.

From what has been said above, it is easy to understand, that if at any moment an increase in pressure is brought about in the main brake pipe, both the differential operating piston and the equalizing piston will move in the position of equilibrium first attained moving downwards so that seat 26 will leave contact with valve 27 and the air in the brake cylinder through passages 35 and 34, hole 33, discharge chamber G' below piston 6 and passages 25, can discharge freely outside or to the atmosphere. This discharge will be slightly delayed as the valve 9 will not open until the pressure on the piston 7 is dropped, this delay being occasioned due to the fact that the initial discharge is only through the orifice 11.

As soon as the exhaust of the brake cylinder will have attained such a value that a new condition of equilibrium can be established, the pistons, (that is to say the differential operating piston 12 and the equalizing piston 6) will rise again until the discharge is closed, without however reopening the feed-valve.

The lost motion existing between the exhaust valve 27 and feed-valve stem 3, prevents the end of one phase to be followed by an untimely beginning of next phase.

Summing up, according to circumstances, the differential controlling piston and the equalizing piston, will be able to assume three different positions: feeding; discharging, neutral or equilibrium position.

It should be noted, that during the operation of the brakes, the feed and discharge positions are temporary and last what time is necessary to reach the neutral or equilibrium position. It should also be noted, that unto every value of the pressure in the main brake pipe, corresponds a given pressure in the brake cylinder 35'. Unto every variation, even very slight, of pressure in the main brake pipe, corresponds always a given variation in the brake cylinder pressure, due to the high sensitivity of the operating piston.

When the brakes are on, the increase in pressure in the main brake pipe, causes the release of the brakes. More particularly, when the pressure in the brake pipe overcomes by a certain value the pressure existing in the auxiliary reservoir, piston 1 and its controlling slide valve 2— move from their right hand end position (Fig. 2) to their left hand end position (Fig. 1). The recess 4 cut in said slide valve connects the accelerating chamber with the brake cylinder 35', through passage 44, equalizing chamber G, passage 34, chambers 9' and 7' and passage 35 whilst cavity 30 similarly cut in the slide valve, connects the auxiliary reservoir with the brake pipe through chamber B and labyrinth 16.

It should be noted in the first place that, whilst for the first braking, piston 1 moves only under a difference in pressure of 0.2 to 0.3 kilos existing on its two faces, in the subsequent motions it proves to have a much greater sensitivity, due both to the lesser pressure existing in the auxiliary reservoir, as to the fact that whilst brakes released a large portion of the flat valve is connected with the atmosphere, with brakes on, the same portion is connected instead either to the brake pipe or to the brake cylinder, which further reduces virtually the pressure exerted on the slide valve and consequently the inherent frictional resistance.

Chamber B is in connection with the brake pipe through passage 16 and with the auxiliary reservoir $S_a$, through pipes 28 and 29 having a relative large section; the pressure exerted on the upper face of piston 12, will therefore, be the same prevailing in the auxiliary reservoir.

Such a feature offers following advantages:

(a) The release of brakes is controlled by the pressure existing in the auxiliary reservoir: the inexhaustibility of the brake is therefore absolutely independent from the ability of the driver operating the brake.

(b) The release of the brakes is not influenced by sudden pressure variations brought about in the brake pipe when attempting a partial release. There will not occur, therefore, as in valves of the other patterns, an over-release followed by re-application which always cause abnormal reactions between the vehicles.

Going on releasing further the brakes, when a pressure of about 4,85 kilos is reached in the auxiliary reservoir and in the brake cylinder the corresponding pressure of about 0,45 kilos: piston 7 rises completely, causing the rise of valves 9, 10 and 5.

The control chamber F will thus be connected to the auxiliary reservoir $S_a$ through pipe 32, chamber E and pipe 31, the operating piston becomes dead and the complete release can be obtained freely, independently of the time taken afterwards by the main brake pipe to attain the initial working pressure of 5 kilos.

In order to accelerate the release, the driver can feed the main brake pipe, by placing the brake valve in the first or quick release position. Such an operation, dangerous for valve equipments of other patterns, because it may cause an overcharge in the control chamber which would prolong the operation of release and make it more difficult, does not in the present case cause any concern whatever. In fact not only is the control chamber fed in series with chamber B and with the auxiliary reservoir, but with brakes on, the retaining valve 5 makes any overload of the same control chamber virtually impossible. An eventual overload of the auxiliary reservoir cannot hinder in any way the release of brakes.

When therefore, after the release has taken place, valve 5 opens in consequence of the lifting of piston 7, the eventual overload of the auxiliary reservoir is partially transmitted also to the control chamber F, but with a beneficial effect, as it lowers the existing pressure in the auxiliary reservoir $S_a$ stabilizing the position of piston 1. Moreover, when the pressure of the auxiliary reservoir $S_a$ is higher than the regular working pressure, also the friction resistance of the slide valve 2 is increased, on account of the fact that it increases the load impressed by said pressure on the slide valve. This fact allows the driver to drop with a certain rapidity the pressure of the brake pipe without causing a displacement of the piston 1 that is more hard to move.

With released brakes any overload is self removed, the control chamber and the auxiliary reservoir being in free connection one to another and with the main brake pipe through pasage 16. In all types of brake, an exhaust valve must be provided for the release of the brakes when the vehicle is isolated from the brake pipe or abandoned in the railway yard. In the present case, said exhaust valve may be provided on the auxiliary reservoir so as to allow to empty the same and therefore also the brake cylinder.

No exhaust valve is fitted on the main controlling chamber F. Such a valve, which appears to be indispensable in other types of valves, can cause leakages which would handicap radically the brake's operation. As stated above, the working pressure of all the brake system may be decreased without causing any braking action, by lowering the pressure in the brake pipe so slowly that piston 1 does not move toward its right hand end position. On the other hand, with the brakes on, while piston 1 is in its left hand end position, the slow lowering of the brake pipe pressure causes an increasing of the brake action. In effect, suppose the brakes are on, the piston 1 in its left position and the differential operating piston with the equalizing piston 6 in their neutral position, the device is in equilibrium. Supposing now to lower slowly the pressure of the brake pipe, the piston 1 does not move, in consequence of the frictional resistance of the slide valve 2 on its seat; the air of the auxiliary reservoir $S_a$ flows back towards the brake pipe and through pipes 29 and 28 said air arrives to chamber B and hence passes to the brake pipe through the throttle 16. The pressure in the chamber B drops and when said drop will have reached a certain value, the equilibrium of the differential operating piston is broken and said piston will rise. The value of the drop of pressure in chamber B, necessary to cause the displacement described is very slight, due to the great sensitivity of the differential operating piston.

When said differential operating piston rises, the packing 40 cuts out the connection between the auxiliary reservoir and the chamber B. At the same time, the stem 15 causes the equalizing piston 6 to lift also, so opening the feed-valve 3' which permit the air of the auxiliary reservoir $S_a$ to reach the cavity G and, through passage 34, the brake cylinders. The brake pressure into said cylinders increases and also the pressure in the chamber G above the equalizing piston 6 increases. When said increasing of pressure in chamber G has reached a value proportional to the preceding drop of pressure therein, the equilibrium is restored and pistons 6 and 12 return to their neutral position. The feed-valve 3 closes, cutting out the entrance of air in the brake cylinders. By repeating now the slow decreasing of pressure in the brake pipe 21 and consequently in chamber B the phenomenon is repeated and the pressure into brake cylinders increases another time. This fact continues until the maximum braking is obtained: at this point the differential operating piston remains in its highest position and packing 40 cuts out permanently the connection between the auxiliary reservoir and chamber B which remains connected only to the brake pipe 21. A further decrease in pressure in the brake pipe will obtain the effect of moving piston 1.

In order to obtain the collaboration in the braking of cylinder 36, also, so as to brake a loaded vehicle, it is sufficient to operate the cock so as to move its controlling lever in the corresponding position. The cock 20, rotating counter-clockwise, connects passage 19 with the discharge passage 37, passage 38 with passage 39, increasing the volume of air passing through labyrinth 16, and connects also passage 42 with passage 36 going to the brake-cylinder 36'.

The operation of the valve is the same as described above, with the exception that the second cylinder comes into action, served by the feeding pipes 41, 36 and the exhaust pipes 19, 37, altogether independent from those of the "Tare" cylinder 35'.

As already stated, by replacing cock 20 shown in the drawings by another type of cock, one can use the same triple valve for operating on vehicles used either on freight trains or on passenger trains. It is not necessary to go into further details about such special working conditions, because the operation corresponds to the requirements of either service condition, according to the position in which the cock is placed, whilst in all cases it is maintained as above described. Correspondingly to the one or the other position of the cock, only the time taken for filling or discharging the brake cylinder is varied. In the "freight" position the time is much greater to allow the braking of long trains without causing reactions which may damage the load or the rolling stock itself.

In Figures 1 and 2, the feeding of the auxiliary reservoir is adjusted by the labyrinth which, in the release phase, forms a throttle of such importance as to maintain quite distinct the values in the pressure above and below the labyrinth.

With such a device, the feeding of the auxiliary reservoir will be more or less quick, according to the position of the vehicles in the train and according to the way the engine driver operates the brake for feeding the main brake pipe.

On the other hand when the driver keeps for a long time the brake valve in the first position to accelerate the release of the brakes of the cars at the rear of a long train, the feeding of the auxiliary reservoirs of the cars at the head of the train is too quick and this fact, besides consuming air appointed to the release of the rear cars, may cause overload phenomena which, even when harmless, for the brake's operation, create always constraints in the release of brakes.

Figure 3:
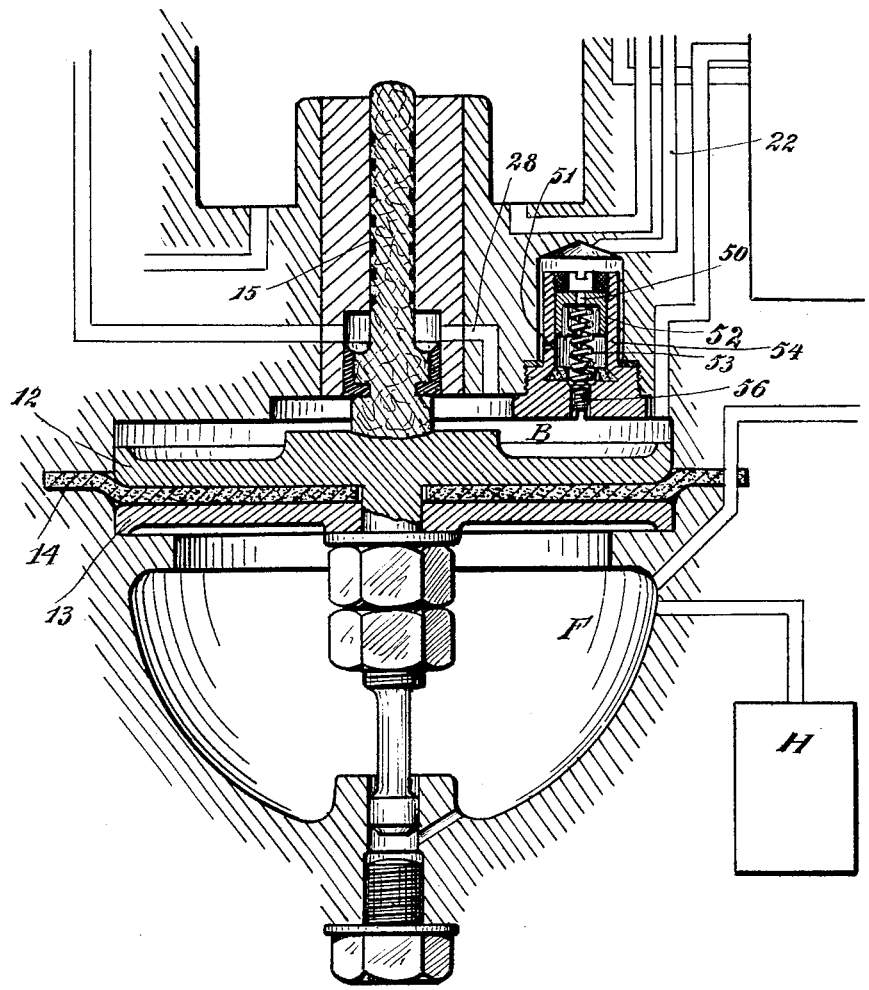
Fig. 3 shows diagrammatically a vertical section of the equalizing feed-valve of the auxiliary reservoir.

In order to avoid such drawbacks, labyrinth 16 can be replaced by a calibrated regulating valve, of the type illustrated in Fig. 3.

The brake pipe 21 is, in connection with chamber B through a hole 51 in the body 55 of the regulating valve and through a hole 50 in piston 52 of said valve. If the incoming air from the main brake pipes is not moving very fast, said air may pass freely into the internal cavity of the body 55 through holes 50 and 51 and hence to the chamber B through holes 56.

If, on the contrary, the feeding is obtained by placing the brake valve in the first position, the incoming air in the main brake pipes of the vehicles at the head of the train, moves on very quickly and in conduits 21 and 22 there builds up a pressure considerably higher than in chamber B.

As soon as the difference in pressure existing in the pipe 22 and in chamber B is sufficient to overcome the antagonistic action of spring 53, piston 52 drops, seats on packing 54 and the feeding of the auxiliary reservoir takes place exclusively through the calibrated hole 50.

As soon as the difference in pressure existing between pipe 22 and chamber B will have dropped by a certain amount (about 0,5 kilos) the piston 52 will rise under the action of spring 53, and any further feeding of the auxiliary reservoir will take place through hole 50 and also through hole 51.

The valve now described operates in the manner of a regulating valve, preventing a too quick feeding of the auxiliary reservoir when the pressure in the main brake pipe rises above certain limits. Overload phenomena of the reservoirs in the vehicles of the head of the train are consequently avoided, thus improving the operation of the brake.

Piston 1 is in its left hand end position with its slide valve 2. The differential operating piston 12, the stem 15, the equalizing piston 6, the valve 27 and the feed-valve 3 are in their lowest positions (Fig. 1). Valve 7 is in its highest position, valve 9 is consequently lifted and opened: through stem 10, the valve 5 is also maintained lifted and opened against the action of its spring. The air of the brake pipe 21 passes freely through pipe 22, throttle 16, chamber B, pipe 28, pipe 29, cavity 30 and chamber C, to the auxiliary reservoir $S_a$. The entrance of air from the auxiliary reservoir $S_a$ through cavity 30 and pipe 18 to the chamber G is prevented by valve 3' which is closed. Accelerating chamber 8 is in communication with chamber 9' through passage 24 and pipes 44 and 34. Chamber G is in communication with the atmosphere through valve 27 opened and passage 25. Chamber C, through passage 31 communicates with brake cylinder controlling chamber E and through valve 5 opened and pipe 32, with the controlling chamber F. The brake cylinder 35' through pipe 35, valve 9 lifted and opened, pipe 34 and chamber G, communicate with the atmosphere.

*Braking.*—Piston 1 is in its right hand end position with its slide valve 2 (see Fig. 2). The differential operating piston 12, the stem 15, the equalizing piston 6, the valve 27 and the feed-valve chamber 3a are in the positions, as represented in Fig. 2. Piston 7, valve 9, stem 10 and valve 5 is each in its raised position in the first phase of the braking and in its lowest position in the second phase of the braking, when the pressure in the brake cylinder will have reached a value sufficient to depress the spring 17 of the piston 7. The air of the chamber B passes towards the brake pipe 21 through labyrinth 16 and pipe 22 until the pressure of this chamber will reach the value of the pressure in the pipe 21. Stem 15 cuts out with the packing 40 the communication between chamber C and chamber B. Chamber C through cavity 30, pipe 18, feed-valve chamber 3a opened, chamber G, pipe 34, valve 9 opened in the first phase and through hole 11 in the second phase of the braking pass to the pipe 35 of the brake cylinder 35'. Passage 33 is closed by valve 27 and chamber G may not communicate with the atmosphere through pipe 25. Chamber 8 communicates through cavity 4 and pipe 23 with the pipe 22, accelerating the drop of the pressure in chamber B and consequently stabilizing the position of the various valves. Chamber F is isolated from the auxiliary reservoir by means of the slide valve 2 in the first phase, and by means of the valve 5 dropped, in the second phase.

*Brakes on.*—Piston 1 may be in its right hand position or in its left hand one, according the variations of pressure that the driver has precedently produced in the brake pipe 21. Piston 12, stem 15, piston 6 are in a middle or neutral position: the valve 27 cuts out the communication between chamber G and the atmosphere, but the feed-valve chamber 3a is closed (in its lowest position), this fact being permitted by the lost motion existing between the stem of the feed-valve 3 and the body of the valve 27. Packing 40 permits the communication between pipes 29 and 28. Valves 7, 9 and 5 is each in its lowest position.

*Releasing.*—Piston 1 and slide valve 2 may be either in its left or right positions according the variations of pressure that the driver has precedently produced in the brake pipe 21. Piston 12, stem 15, piston 6 are in its lowest position: the valve 3 remains against closed, valve 27 is opened and chamber G, through passage 33 and pipe 25 communicates with the exterior. Brake cylinder 35', through pipe 35, calibrated hole 11 and pipe 34 communicates with said chamber G and hence with the exterior. When the pressure in brake pipe 21 has attained a predetermined value, the piston 1 moves to its left hand end position if it was in its right hand position. The reservoir Sa may be supplied with air through cavity 30, pipe 29 and 28, chamber B and pipe 22 from the brake pipe 21. Chamber 8 is discharged through cavity 4 and pipe 44 into the chamber G communicating with the atmosphere. When the pressure of the brake pipe has been sufficiently diminished, the piston 7 lifts and opens the valves 9 and 5. Through the valve 9 the brake cylinder 35 will rapidly be discharged and through valve 5 the controlling chamber F will be supplied with pressure from the auxiliary reservoir Sa through pipe 31.

Evidently the design of particulars is given here simply as an example, and may vary considerably in practical achievement without exceeding thereby the field of the present invention.

What we claim is:

1. A fluid pressure brake apparatus of the class described having in combination a triple valve casing provided with spaced openings, a piston and slidable valve mounted in said casing for actuation by variation in train pipe pressure, said slidable valve having an opening and a recess arranged to selectively register with the openings in the valve casing upon movement of the piston, means delivering brake pipe pressure to the triple valve casing on one side of the piston, an auxiliary reservoir communicating with the triple valve casing on the opposite face of said piston, means for establishing communication between the auxiliary reservoir and the brake pipe, a brake cylinder, a brake cylinder controlling chamber provided with valve means for controlling the flow of the supply from the auxiliary reservoir to the brake cylinder, a chamber having a diaphragm valve separating the same into a control chamber and a differential chamber, a passage communicating the control chamber with the auxiliary reservoir, a valve in said passage for controlling the supply therethrough, an equalizing chamber having an equalizing piston, means communicating one side of the piston with the atmosphere, means communicating the opposite side of said equalizing piston with the auxiliary reservoir and the brake cylinder, a central feed valve for controlling the communication between the auxiliary reservoir and the equalizing piston, said equalizing piston having a passage communicating with opposite sides thereof, a valve operable by the movement of said equalizing piston for controlling said passage, said diaphragm valve having a stem extending into the equalizing chamber for actuating said equalizing piston, and means upon movement of the slidable valve to brake applying position for establishing communication of the auxiliary reservoir with the brake pipe and cutting off communication between the auxiliary reservoir and the differential chamber.

2. A fluid pressure brake apparatus of the class described having in combination a triple valve casing provided with spaced openings, a piston and slidable valve mounted in said casing for actuation by variation in train pipe pressure, said slidable valve having an opening and a recess arranged to selectively register with the openings in the valve casing upon movement of the piston, means delivering brake pipe pressure to the triple valve casing on one side of the piston, an auxiliary reservoir communicating with the triple valve casing on the opposite face of said piston, means for establishing communication between the brake pipe and the auxiliary reservoir, a brake cylinder, means communicating the brake cylinder with the auxiliary reservoir, a brake cylinder controlling chamber provided with valve means for controlling the flow of the supply from the auxiliary reservoir to the brake cylinder, a chamber having a diaphragm valve separating the same into a control chamber and a differential chamber, a passage communicating the control chamber with the auxiliary reservoir and the brake cylinder chamber, a valve in said passage for controlling the supply therethrough, an equalizing chamber having a piston communicating on one side with the atmosphere and on its opposite side with the auxiliary reservoir, a central feed valve for controlling the communication between the auxiliary reservoir and the equalizing piston, said equalizing piston having a passage communicating with opposite sides thereof and controlled by said central feed valve, said diaphragm valve having a stem extending into the equalizing chamber for actuating said equalizing piston, a passage communicating the differential chamber with the brake pipe and the auxiliary reservoir, and means on said stem for controlling communication between the auxiliary reservoir and the brake pipe.

3. A fluid pressure brake apparatus of the class described having in combination a triple valve casing provided with spaced openings, a piston and slidable valve mounted in said casing for actuation by variation in train pipe pressure, said slidable valve having an opening and a recess arranged to selectively register with the openings in the valve casing upon movement of the piston, means delivering brake pipe pressure to the triple valve casing on one side of the piston, an auxiliary reservoir communicating with the triple valve casing on the opposite face of said piston, means for establishing communication between the brake pipe and the auxiliary reservoir, a brake cylinder, means communicating the brake cylinder with the auxiliary reservoir, a brake cylinder controlling chamber provided with valve means for controlling the flow of the supply from the auxiliary reservoir to the brake cylinder, a chamber having a diaphragm valve separating the same into a control chamber and a differential chamber, a passage communicating the control chamber with the auxiliary reservoir and the brake cylinder chamber, a valve in said passage for controlling the supply therethrough, an equalizing chamber having a piston communicating on one side with the atmosphere and on its opposite side with the auxiliary reservoir, a central feed valve for controlling the communication between the auxiliary reservoir and the equalizing piston, said equalizing piston having a passage communicating with opposite sides thereof and controlled by said central feed valve, said diaphragm valve having a stem extending into the equalizing chamber for actuating said equalizing piston, a passage communicating the differential chamber with the brake pipe and the auxiliary reservoir, means on said stem for controlling communication between the auxiliary reservoir and the brake pipe, and means for retarding the flow of the supply between the brake pipe and the auxiliary reservoir.

4. A fluid pressure brake apparatus of the class described having in combination a triple valve casing provided with spaced openings, a piston and slidable valve mounted in said casing for actuation by variation in train pipe pressure, said slidable valve having an opening and a recess arranged to selectively register with the openings in the valve casing upon movement of the piston, means delivering brake pipe pressure to the triple valve casing on one side of the piston, an auxiliary reservoir communicating with the triple valve casing on the opposite face of said piston, a brake cylinder, means communicating the auxiliary reservoir with the brake cylinder, a brake cylinder controlling chamber provided with valve means for controlling the flow of the supply from the auxiliary reservoir to the brake cylinder, a chamber having a diaphragm valve separating the same into a control chamber and a differential chamber, a passage communicating the control chamber with the auxiliary reservoir, a valve in said passage for controlling the supply therethrough, an equalizing chamber having a piston communicating on one side with the atmosphere and on its opposite side with the auxiliary reservoir, a central feed valve for controlling the communication between the auxiliary reservoir and the equalizing piston, said equalizing piston having a passage communicating with opposite sides thereof and controlled by said central feed valve, said diaphragm valve having a stem extending into the equalizing chamber for actuating said equalizing piston, an accelerating chamber communicating with the triple valve casing, said slidable valve controlling communication between the accelerating chamber and the triple valve casing, and means communicating the accelerating chamber with the brake cylinder chamber when the slidable valve is moved to brake release position.

5. A fluid pressure brake apparatus of the class described having in combination a triple valve casing provided with spaced openings, a piston and slidable valve mounted in said casing for actuation by variation in train pipe pressure, said slidable valve having an opening and a spaced recess arranged to register with complementary openings in said valve casing, means delivering brake pipe pressure to the triple valve casing on one side of the piston, an auxiliary reservoir communicating with the triple valve casing on the opposite face of said piston, a brake cylinder, a chamber having a diaphragm valve separating the same into a control chamber and a differential chamber, an equalizing chamber having an equalizing piston mounted therein, said diaphragm valve having a stem extending into the equalizing chamber for actuating the equalizing piston, a central feed valve communicating with the equalizing chamber and the auxiliary reservoir on one side of the equalizing piston, and means on the opposite side of the equalizing piston for establishing communication with the atmosphere.

6. A fluid pressure brake apparatus of the class described having in combination a triple valve casing provided with spaced openings, a piston and slidable valve mounted in said casing for actuation by variation in train pipe pressure, said slidable valve having an opening and a spaced recess arranged to register with complementary openings in said valve casing, means delivering brake pipe pressure to the triple valve casing on one side of the piston, an auxiliary reservoir communicating with the triple valve casing on the opposite face of said piston, a brake cylinder, a chamber having a diaphragm valve separating the same into a control chamber and a differential chamber, an equalizing chamber having an equalizing piston mounted therein, said diaphragm valve having a stem extending into the equalizing chamber for actuating the equalizing piston, a central feed valve communicating with the equalizing chamber and the auxiliary reservoir on one side of the equalizing piston, means on the opposite side of the equalizing piston for establishing communication with the atmosphere, and an accelerating chamber, said sliding valve selectively communicating the accelerating chamber with the brake pipe and the atmosphere.

7. A fluid pressure brake apparatus of the class described having in combination a triple valve casing provided with spaced openings, a piston and slidable valve mounted in said casing for actuation by variation in train pipe pressure, said slidable valve having an opening and a spaced recess arranged to register with complementary openings in said valve casing, means delivering brake pipe pressure to the triple valve casing on one side of the piston, an auxiliary reservoir communicating with the triple valve casing on the opposite face of said piston, a brake cylinder, means communicating the auxiliary reservoir with the brake cylinder, a brake cylinder controlling chamber provided with valves for controlling the supply from the auxiliary reservoir to the brake cylinder, a chamber having a diaphragm valve separating the same into a control chamber and a differential chamber, a passage communicating the control chamber with the brake cylinder chamber, a passage communicating the brake pipe with the differential chamber and having a throttle member formed therein, a passage communicating the differential chamber with the auxiliary reservoir, and means operable by the diaphragm valve for controlling the supply from the differential chamber to the auxiliary reservoir.

8. A fluid pressure brake apparatus of the class described having in combination a triple valve casing provided with spaced openings, a piston and slidable valve mounted in said casing for actuation by variation in train pipe pressure, said slidable valve having an opening and a spaced recess arranged to register with the complementary openings in said valve casing, means delivering brake pipe pressure to the triple valve casing on one side of the piston, an auxiliary reservoir communicating with the triple valve casing on the opposite face of said piston, a brake cylinder, a passage communicating the auxiliary reservoir with the brake cylinder, a brake cylinder controlling chamber provided with valves for controlling the supply from the auxiliary reservoir to the brake cylinder, a chamber having a diaphragm valve separating the same into a control chamber and a differential chamber, a passage communicating the control chamber with the brake cylinder chamber, a passage communicating the brake pipe with the differential chamber and having a throttle member formed therein, a passage communicating the differential chamber with the auxiliary reservoir, an equalizing chamber having an equalizing piston mounted therein, said diaphragm valve having its stem extending into the equalizing chamber for actuating the equalizing piston, a central feed valve controlling communication between one side of the equalizing piston and the auxiliary reservoir, means communicating the opposite side of the equalizing piston with the atmosphere, and a passage communicating the equalizing chamber with the brake cylinder.

9. A fluid pressure brake apparatus of the class described having in combination a triple valve casing provided with spaced openings, a piston and a slidable valve mounted in said casing for actuation by variation in train pipe pressure, said slidable valve having an opening and a spaced recess arranged to register with complementary openings in said valve casing, means delivering brake pipe pressure to the triple valve casing on one side of the piston, an auxiliary reservoir communicating with the triple valve casing on the opposite face of said piston, a brake cylinder, a chamber having a diaphragm valve separating the same into a control chamber and a differential chamber, an equalizing chamber having an equalizing piston mounted therein, said diaphragm valve having means extending into the equalizing chamber for actuating the equalizing piston, means establishing communication between said equalizing chamber and the brake cylinder, means establishing communication between the auxiliary reservoir and the brake cylinder, means communicating the auxiliary reservoir with the equalizing chamber, and means for establishing communication between the auxiliary reservoir and the brake cylinder and cutting off communication of the equalizing chamber with the atmosphere when the brakes are applied.

10. A fluid pressure brake apparatus of the class described having in combination a triple valve casing provided with spaced openings, a piston and a slidable valve mounted in said casing for actuation by variation in train pipe pressure, said slidable valve having an opening and a spaced recessed portion arranged to register with complementary openings in said valve casing, means delivering brake pipe pressure to the triple valve casing on one side of the piston, an auxiliary reservoir communicating with the triple valve casing on the opposite face of said piston, a brake cylinder, a chamber having a diaphragm valve separating the same into a control chamber and a differential chamber, an equalizing chamber having an equalizing piston mounted therein, said diaphragm valve having its stem extending into the equalizing chamber for actuating the equalizing piston, means establishing communication between said equalizing chamber and the brake cylinder, means establishing communication between the auxiliary reservoir and the brake cylinder, means communicating the auxiliary reservoir with the equalizing chamber, and means when the apparatus is in its brake released position for communicating the equalizing chamber with the atmosphere.

11. A fluid pressure brake apparatus of the class described having in combination a triple valve casing provided with spaced openings, a piston and a slidable valve mounted in said casing for actuation by variation in train pipe pressure, said slidable valve having an opening and a spaced recessed portion arranged to register with complementary openings in said valve casing, means delivering brake pipe pressure to the triple valve casing on one side of the piston, an auxiliary reservoir communicating with the triple valve casing on the opposite face of said piston, a brake cylinder, a chamber having a diaphragm valve separating the same into a control chamber and a differential chamber, an equalizing chamber having an equalizing piston mounted therein, said diaphragm valve having its stem extending into the equalizing chamber for actuating the equalizing piston, means communicating the control chamber with the auxiliary reservoir when one of the openings in the slide valve registers with its complementary opening in the valve casing, means on the stem of the diaphragm valve for cutting off communication between the auxiliary reservoir and the differential chamber, and means for establishing communication between the control chamber and auxiliary reservoir upon movement of the slide valve.

12. A fluid pressure brake apparatus of the class described having in combination a triple valve casing provided with spaced openings, a piston and a slidable valve mounted in said casing for actuation by variation in train pipe pressure, said slidable valve having an opening and a spaced recessed portion arranged to register with complementary openings in said valve casing, means delivering brake pipe pressure to the triple valve casing on one side of the piston, an auxiliary reservoir communcating with the triple valve casing on the opposite face of said piston, a brake cylinder, a chamber having a diaphragm valve separating the same into a control chamber and a differential chamber, an equalizing chamber having an equalizing piston mounted therein, said diaphragm valve having its stem extending into the equalizing chamber for actuating the equalizing piston, means establishing communication between the auxiliary reservoir and the differential chamber, means establishing communication between the auxiliary reservoir and the equalizing chamber, and means establishing communication between the brake cylinder and the equalizing chamber to permit the pressure in the brake cylinder to escape the atmosphere.

13. A fluid pressure brake apparatus having in combination a triple valve casing provided with spaced openings, a piston and slidable valve mounted in said casing for actuation by variation in train pipe pressure, said slidable valve having an opening and a recess each arranged to register with complementary openings in said valve casing, means delivering brake pipe pressure to the triple valve casing on one side of the piston, an auxiliary reservoir communicating with the triple valve casing on the opposite face of said piston, an accelerating chamber communicating with the triple valve casing, a brake cylinder, a chamber having a diaphragm valve separating the same into a control chamber and a differential chamber, an equalizing chamber having an equalizing piston mounted therein, said diaphragm valve having its stem extending into the equalizing chamber for actuating the equalizing piston, means communicating one side of the equalizing piston with the atmosphere, means communicating the opposite side of said equalizing piston with said brake cylinder, valve means controlling communication between the atmosphere and the equalizing chamber, a control feed valve chamber communicating with the brake cylinder and with the equalizing chamber, a retaining valve for controlling communication between the control chamber and the control feed valve chamber, means establishing communication between the differential chamber and the brake pipe, means communicating the control chamber with the auxiliary reservoir, and means upon movement of the slide valve to apply the brake for cutting off communication between the equalizing chamber and the atmosphere.

14. A fluid pressure brake apparatus having in combination a triple valve casing provided with spaced openings, a piston and slidable valve mounted in said casing for actuation by variation in train pipe pressure, said slidable valve having an opening and a recess arranged to register with complementary openings in said valve casing, means delivering brake pipe pressure to the triple valve casing on one side of the piston, an auxiliary reservoir communicating with the triple valve casing on the opposite face of said piston, an accelerating chamber communicating with the triple valve casing, a brake cylinder, a chamber having a diaphragm valve separating the same into a control chamber and a differential chamber, an equalizing chamber having an equalizing piston mounted therein, said diaphragm valve having its stem extending into the equalizing chamber for actuating the equalizing piston, means communicating one side of the equalizing piston with the atmosphere, means communicating the opposite side of said equalizing piston with said brake cylinder, valve means controlling communication between the atmosphere and the equalizing chamber, a control feed valve chamber communicating with the brake cylinder and with the equalizing chamber, a retaining valve for controlling communication between the control chamber and the control feed valve chamber, means establishing communication between the differential chamber and the brake pipe, means communicating the control chamber with the auxiliary reservoir, and means when the apparatus is in its released position for establishing communication of the brake cylinder with the atmosphere.

15. A fluid pressure brake apparatus of the class described having in combination a triple valve casing provided with spaced openings, a piston and slidable valve mounted in said casing for actuation by variation in train pipe pressure, said slidable valve having an opening and a spaced recess arranged to register with complementary openings in said valve casing, means for establishing communication between the brake pipe and the auxiliary reservoir, a brake cylinder communicating with the auxiliary reservoir, valve means for controlling the pressure in the brake cylinder, means delivering brake pipe pressure to the triple valve casing on one side of the piston, a chamber having a diaphragm valve separating the same into a control chamber and a differential chamber, an equalizing chamber operatively associated with said diaphragm valve, an accelerating chamber communicating with the triple valve casing, means communicating the accelerating chamber with the brake cylinder, means communicating the auxiliary reservoir with the brake cylinder, means communicating the auxiliary chamber with the equalizing chamber, and means communicating the equalizing chamber with the atmosphere.

16. A fluid pressure brake apparatus of the class described having in combination a triple valve casing provided with spaced openings, a piston and slidable valve mounted in said casing for actuation by variation in train pipe pressure, said slidable valve having an opening and a spaced recess arranged to register with complementary openings in said valve casing, means delivering brake pipe pressure to the triple valve casing on one side of the piston, an auxiliary reservoir communicating with the triple valve casing on the opposite first of said piston, means establishing communication between the brake pipe and the auxiliary reservoir, a pair of brake cylinders, valve means for controlling the pressure in the brake cylinders, a chamber having a diaphragm valve separating the same into a contral chamber and a differential chamber, means operable by the diaphragm valve for controlling communication between the brake pipe and auxiliary reservoir, an equalizing chamber having an equalizing piston mounted therein, a passage communicating the auxiliary reservoir with one side of the equalizing piston, means communicating the opposite side of the equalizing piston with the atmosphere, and means communicating the brake cylinder with the atmosphere through the equalizing chamber when the triple valve is in its release position.

MARIO FASOLI.
MANLIO DIEGOLI.